United States Patent
Bolasna et al.

(10) Patent No.: US 6,421,908 B1
(45) Date of Patent: Jul. 23, 2002

(54) METHOD OF MAKING SHALLOW ETCH AIR BEARING SURFACE FEATURES FOR OPTIMIZED TRANSDUCER SPACING

(75) Inventors: Sanford A. Bolasna; Laurence S. Samuelson, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 08/893,220

(22) Filed: Jul. 15, 1997

Related U.S. Application Data

(62) Division of application No. 08/609,602, filed on Mar. 1, 1996, now Pat. No. 5,825,587.

(51) Int. Cl.$^7$ ............................................. G11B 5/42
(52) U.S. Cl. .................................................. 29/603.12
(58) Field of Search ........................ 29/603.12; 360/103

(56) References Cited

U.S. PATENT DOCUMENTS

| | | |
|---|---|---|
| 4,673,996 A | 6/1987 | White |
| 4,998,174 A | 3/1991 | Wada et al. |
| 5,134,531 A | 7/1992 | Matsuzaki et al. |
| 5,166,845 A | 11/1992 | Thompson et al. |
| 5,267,109 A | 11/1993 | Chapin et al. |
| 5,296,982 A | 3/1994 | Terada et al. |
| 5,309,303 A | 5/1994 | Hsia et al. |
| 5,327,310 A | 7/1994 | Bischoff et al. |
| 5,343,343 A | 8/1994 | Chapin |
| 5,396,387 A | 3/1995 | Murray |
| 5,404,256 A | 4/1995 | White |
| 5,513,056 A * | 4/1996 | Kawasaki et al. ........... 360/103 |
| 5,636,087 A * | 6/1997 | Matsuzaki et al. .......... 360/103 |
| 5,654,853 A * | 8/1997 | Hagen ........................ 360/106 |
| 5,774,304 A * | 6/1998 | Crane et al. ................ 360/103 |

FOREIGN PATENT DOCUMENTS

| | | |
|---|---|---|
| EP | 0 518 566 A1 | 12/1992 |
| EP | 0 576 904 A1 | 1/1994 |
| EP | 0 600 348 A3 | 6/1994 |
| EP | 0 627 732 A1 | 12/1994 |
| EP | 0 642 130 A2 | 3/1995 |
| JP | 1-43812 A | 2/1989 |
| JP | 4-134771 A | 5/1992 |
| JP | 4-307408 A | 10/1992 |
| JP | 4-362582 | 12/1992 |

OTHER PUBLICATIONS

"Compact Horizontal Head Structure for Arrays," *IBM Technical Disclosure Bulletin*, vol. 36, No. 5, pp. 377–378, May 1993.

* cited by examiner

*Primary Examiner*—Carl E. Hall
(74) *Attorney, Agent, or Firm*—Altera Law Group LLC

(57) ABSTRACT

A shallow etch at the trailing edge rail that allows the slider to fly closer to the recording medium and exhibit less sensitivity to roll. The slider includes a support structure and at least one rail having side edges and an air bearing surface raised above the support structure. At least one of the rails comprises a magnetic element disposed on the support structure. The edges of the rail adjacent to the magnetic element are etched to minimize the fly height of the magnetic element over the disk while preventing collision of the rail with the disk during roll conditions. The etched features of the rail create relieved trailing edge portions where the edges of the rail adjacent to the magnetic element are lower than the air bearing surface but are higher than the support structure. The shallow etch in the air bearing surface minimizes the difference between the minimum mechanical slider/disk spacing and the magnetic head/disk spacing which in turn allows optimization of transducer spacing. The edges of the air bearing surface adjacent the magnetic element are shortened by reactive ion etching or ion milling.

8 Claims, 6 Drawing Sheets

| NEGATIVE PRESSURE DESIGN OF FIG. 5a | INNER-DIAMETER | MIDDLE-DIAMETER | OUTER-DIAMETER |
|---|---|---|---|
| MINIMUM MECHANICAL SPACING | 48.8 | 53.1 | 43.0 |
| MINIMUM MAGNETIC SPACING | 58.0 | 63.0 | 52.9 |
| DIFFERENCE | 9.2 | 9.9 | 9.9 |
| NEGATIVE PRESSURE DESIGN OF FIG. 5b | INNER-DIAMETER | MIDDLE-DIAMETER | OUTER-DIAMETER |
| MINIMUM MECHANICAL SPACING | 48.6 | 54.1 | 43.6 |
| MINIMUM MAGNETIC SPACING | 54.5 | 59.8 | 49.4 |
| DIFFERENCE | 5.9 | 5.7 | 5.8 |

Fig. 6

METHOD OF MAKING SHALLOW ETCH AIR BEARING SURFACE FEATURES FOR OPTIMIZED TRANSDUCER SPACING

This is a Divisional of application Ser. No. 08/609,602, filed Mar. 1, 1996 now U.S. Pat. No. 5,825,587 which application(s) are incorporated herein by reference.

BACKGROUND OF THE INVENTION

1. Field of the Invention

This invention relates in general to air bearing sliders for use with recording media and more particularly, to a slider having air bearing surface features which minimize the difference between the minimum mechanical slider/disk spacing and the magnetic head/disk spacing.

2. Description of Related Art

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the air bearing slider and the transducer over the data tracks, and a positioning actuator connected to the suspension for moving the transducer across the media to the desired data track and maintaining the transducer over the data track during a read or a write operation.

In magnetic recording technology, it is continually desired to improve the areal density at which information can be recorded and reliably read. Because the recording density of a magnetic disk drive is limited by the distance between the transducer and the magnetic media, a goal of air bearing slider design is to "fly" an air bearing slider as closely as possible to a magnetic medium while avoiding physical impact with the medium. Smaller spacings, or "fly heights", are desired so that the transducer can distinguish between the magnetic fields emanating from closely spaced regions on the disk.

Zone bit recording can provide significant performance and capacity improvements in magnetic disk storage files. In order to facilitate this technology, it is desirable to maintain a constant spacing between the read/write head and the disk across all the zones, from the inner-diameter (ID) to the outer-diameter (OD) of the disk. It is also desirable to fly as low as possible across the data zones to increase amplitude and resolution and further increase areal density and file capacity. However, low fly height causes concerns over mechanical reliability in the file, for both start/stop life and long term flyability.

Constant flying heights across the data zones presents a substantial challenge to slider design because the air velocity created by the rotating disk varies in both magnitude and direction relative to the air bearing slider at all radii in rotary actuator files.

An air-bearing slider also experiences fly height variations due to roll. For an air bearing slider with zero skew relative to disk rotation, roll is a measure of the angle of rotation about the longitudinal axis of the air bearing slider. Variations in roll occur when a resiliently mounted slider experiences a skewed air flow or the actuator experiences an impact with the disk. Insensitivity to roll variations is a crucial requirement of air bearing sliders.

Finally, an air bearing slider experiences varying conditions during the high speed radial movement of the actuator as it accesses data on various portions of the disk. High speed movement across the disk can lead to large values of slider roll, pitch and skew and a resultant variation in fly height. This is yet another reason that an air bearing slider must be insensitive to changes in roll, pitch and skew.

Typical taper-flat type sliders cannot satisfy the constant spacing requirements for zone-bit recording. For most rotary actuator configurations, the taper-flat slider flying height increases rapidly as the head is moved out from the ID. As it approaches the middle of the data band, it reaches a maximum spacing, which may be up to twice as large as the initial ID flying height. From there, the clearance drops as the air bearing slider moves toward the outer rim of the disk.

When any of the above described variations in fly height occur, they may result in contact between the air bearing slider and the rapidly rotating recording medium. Any such contact leads to wear of the air bearing slider and the recording surface and is potentially catastrophic.

Prior art slider designs have attempted to avoid this problem by addressing one or more of above described sensitivities, so as to produce an air bearing slider with uniform flying height under the varying conditions that may be experienced by the air bearing slider. Alternative designs for the air bearing surfaces have been developed to provide the required aerodynamic performance. Further, these designs frequently utilize trade-offs between the slider's pitch and roll to achieve the flat head/disk spacing desired. However, the rail width which provides the air bearing surface must also be capable of accommodating the read/write transducer. Consequently, variations in the slider's flying attitude can result in a much lower mechanical slider/disk spacing with a corresponding increase to the magnetic head/disk spacing.

For example, FIG. 1a illustrates a prior art slider 10 having a leading edge 12, a trailing edge 14 and two side edges 16, 18. As the disk begins to rotate, the slider pitches such that the leading edge 12 is raised with respect to the trailing edge 14 as shown in FIG. 1a. The slider illustrated in FIG. 1a includes two side rails 20, 22 and a center rail 24 for a given performance standard. The two side rails 20, 22 and the center rail 24 are disposed on a support structure 26. A transducer 28 is disposed on the center rail 24 at the trailing edge 14 for performing read/write operations on the disk. FIG. 1b illustrates a close-up view of the center rail 24 at the trailing edge 14 of the slider 10. The head gap 32 of the transducer 28 is also shown. Under the above described conditions, the slider may experience roll, indicated by longitudinal displacement angle 34, which may cause the slider to contact the rotating disk due to the much lower mechanical slider/disk spacing. FIG. 2 illustrates how a nominal roll angle 34 causes the mechanical spacing of the center rail edge 42 to be substantially lower than the magnetic gap flying height.

FIG. 2. illustrates a rear view of the prior art slider 10 along lines A—A of FIG. 1a. The view in FIG. 2 is exaggerated for clarity. In FIG. 2, the center rail 24 is shown disposed on the support structure 26. As the slider 10 experiences a nominal roll angle 34, the mechanical spacing 40 between the edge 42 of the center rail 24 and the disk 44 decreases while the magnetic spacing 46 between the head gap 48 and the disk 44 decreases to a lesser degree, remains the same or becomes greater depending upon whether the axis of the roll is displaced from the slider's central longitudinal axis. FIG. 2 illustrates the situation where the magnetic spacing 46 between the head gap 48 and the disk 44 becomes greater. The magnitude of the difference between the mechanical spacing 40 and the magnetic gap flying height 48 can be substantial. For example, a slider with a 400 µm trailing edge rail width and a nominal 50 µrad flying roll attitude will have a minimum mechanical spacing 40 that is ten nanometers (nm) lower than the desired magnetic spacing 46 fly height causing the slider to be raised for increased wear resistance, i.e., increased life-time.

It can be seen then that there is a need for a slider that has air bearing surface features which minimize the difference between the minimum mechanical slider/disk spacing and the magnetic head/disk spacing.

It can also be seen that there is a need for a slider having shallow etch features that allow optimization of transducer spacing.

It can also be seen that there is a need for a disk drive having a slider which exhibits a narrow trailing edge rail while still providing adequate area for the read/write transducer thereby minimizing the difference between the minimum mechanical slider/disk spacing and the magnetic head/disk spacing.

SUMMARY OF THE INVENTION

To overcome the limitations in the prior art described above, and to overcome other limitations that will become apparent upon reading and understanding the present specification, the present invention discloses a shallow etch at the trailing edge rail that allows the slider to fly closer to the recording medium.

A system in accordance with the principles of the present invention comprises a support structure having side edges, a leading and a trailing edge relative to the motion of the recording medium and at least one rail having side edges and an air bearing surface raised above the support structure, wherein at least one of the rails comprises a magnetic element, and wherein the edges of the rail adjacent to the magnetic element are etched to minimize the fly height of the magnetic element over the disk while preventing collision of the rail with the disk during roll conditions. The etched features of the rail create relieved trailing edge portions where the edges of the rail adjacent to the magnetic element may be lower than other air bearing surfaces but are higher than the support structure.

One aspect of the present invention is that the slider has air bearing features which minimize the difference between the minimum mechanical slider/disk spacing and the magnetic head/disk spacing.

Another aspect of the present invention is that the slider has shallow etch features that allow optimization of transducer spacing.

Another aspect of the present invention is that a disk drive may include a slider which exhibits a rail with a narrow trailing edge while still providing adequate area for the read/write transducer thereby minimizing the difference between the minimum mechanical slider/disk spacing and the magnetic head/disk spacing.

In an alternative embodiment the edges of the air bearing surface adjacent the magnetic element are shortened by etching or ion milling, i.e., they do not completely extend to the trailing edge.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 2 illustrates a rear view of the prior art slider along lines A—A of FIG. 1a;

FIG. 4 illustrates a rear view of the slider having shallow etch features according to the present invention along lines B—B of FIG. 3a;

FIG. 5a illustrates a negative pressure slider design wherein the magnetic transducer is not mounted at the trailing edge;

FIG. 5b illustrates a slider with shallow etch features according to the present invention having the air bearing surface geometry of the slider in FIG. 5a; and FIG. 6 is a table containing the modeling results for the minimum mechanical spacing, minimum gap spacing, and the difference therebetween for the sliders illustrated in FIGS. 5a and 5b.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1A:
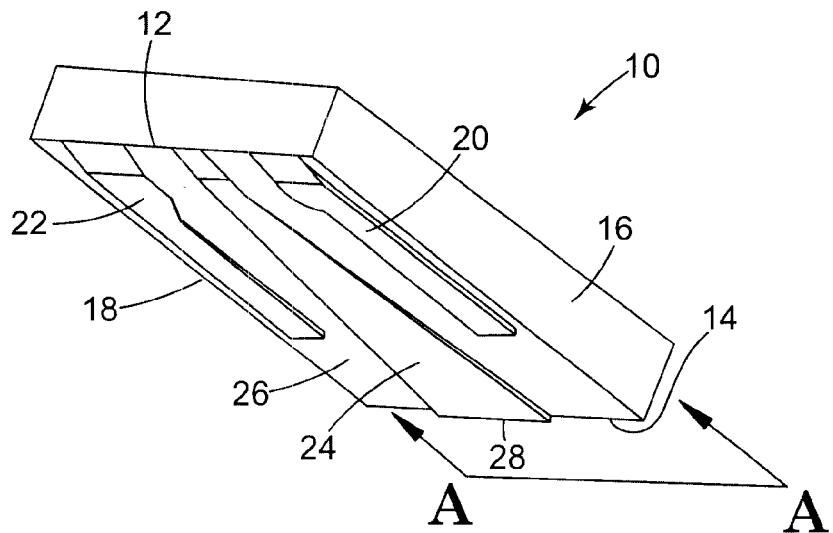
FIG. 1a illustrates a prior art slider.
Figure 1B:
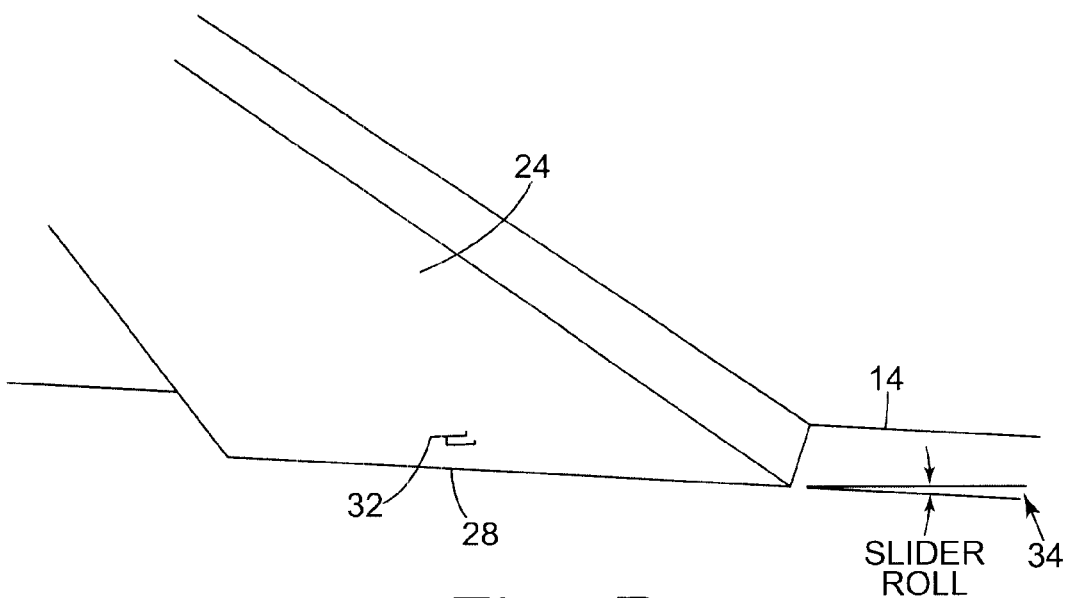
FIG. 1b illustrates the trailing edge of the center rail for the prior art slider of FIG. 1.
Figure 2:
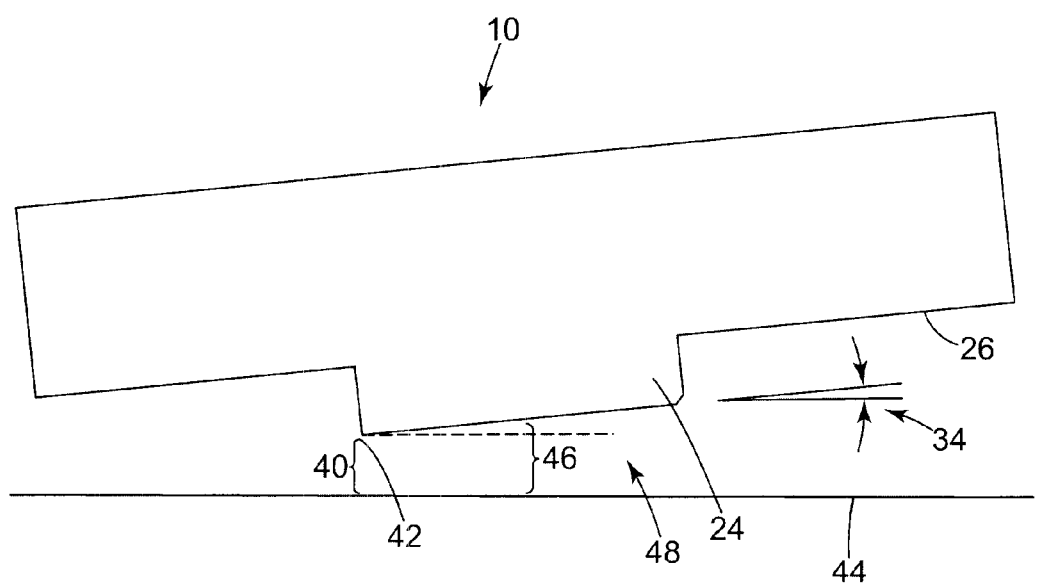
Figure 3A:
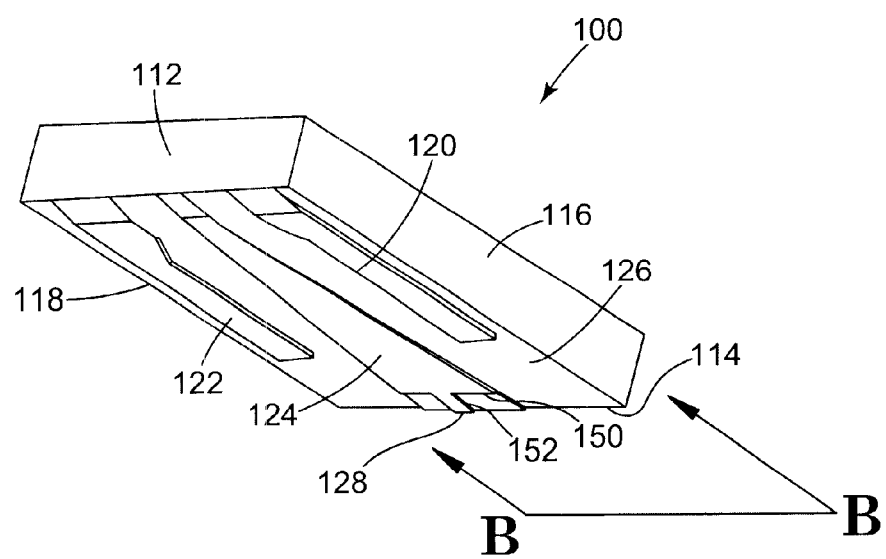
FIG. 3a illustrates a slider having shallow etch features according to the present invention.

FIG. 3a illustrates a slider 100 according to the present invention which is similar to the prior art slider illustrated in FIG. 1a. The slider according to the present invention 100 includes a leading edge 112, a trailing edge 114 and two side edges 116, 118. Two side air bearing surfaces or rails 120, 122 and a center rail 124 for a given aerodynamic performance standard are disposed on a support structure 126. A transducer 128 is disposed on the center rail 124 at the trailing edge 114 for performing read/write operations on the disk. However, the center rail 124 includes shallow etch features 150 adjacent to the magnetic element 128 which causes a portion of the center rail 124 to be shortened a distance relative to the trailing edge 114 of the support structure 126. The shallow etching therefore results in a notch 152 at the trailing edge 114 of the center rail 124 where the magnetic head gap 132 is disposed.

Figure 3B:
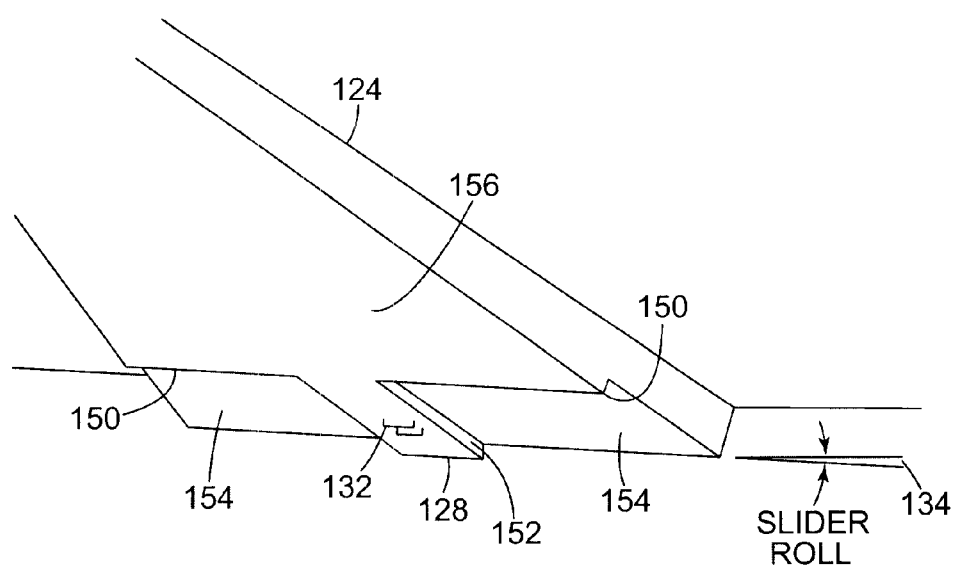
FIG. 3b illustrates the trailing edge of the center rail for the slider having shallow etch features according to the present invention.

FIG. 3b illustrates a close-up view of the center rail 124 at the trailing edge 114 of the slider 100. The head gap 132 is also shown. However, according to the present invention, the above described roll conditions, indicated by angle 134, do not result in as great a difference between the mechanical slider/disk clearance or spacing and the magnetic head/disk spacing.

Figure 4:
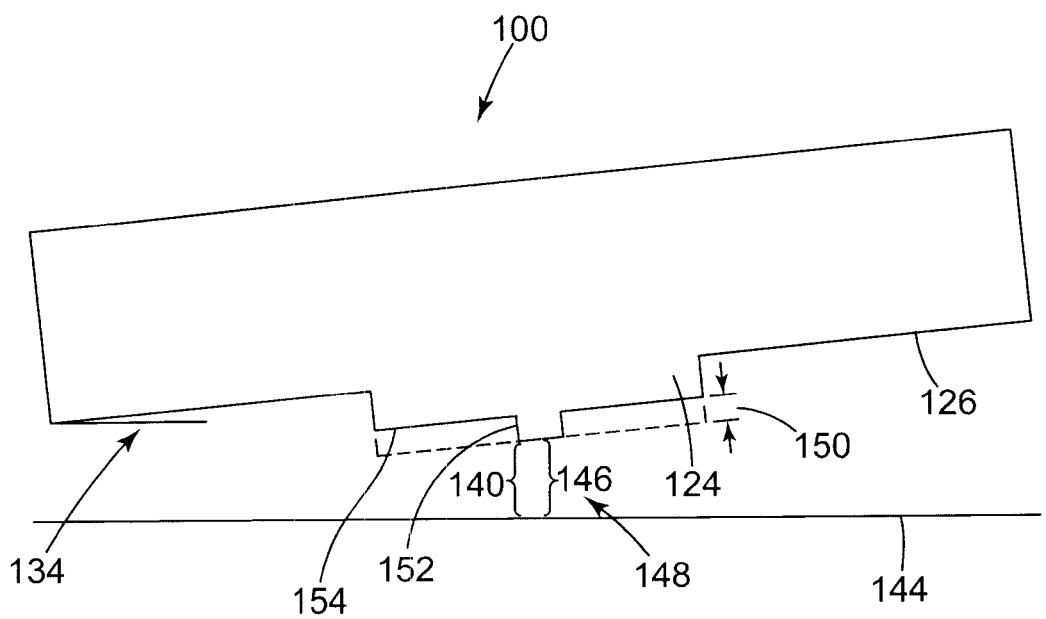

The shallow etch 150 effectively narrows the width of the center rail 124 at the trailing edge 114 while still providing adequate area for the read/write transducer 128. The shallow etched portion 150 of the center rail 124 includes relieved trailing edge portions 154 adjacent to the magnetic element 128 where portions of the center rail 124 are removed and therefore not raised above the support structure 126 to the same level as the remaining air bearing surface 156 of the center rail 124. Preferably, the depth of the etching step should be shallow enough to avoid interference with the element structure to minimize the impact on the transducer or air bearing design. Typically, the etching step depth is on the order of 0.5 µm or less. The shallow etching process may be performed by ion milling, reactive ion etching, or other appropriate techniques known to those skilled in the art of slider manufacturing. FIG. 4 illustrates how a nominal roll angle 134 affects the mechanical and magnetic gap spacing of a slider according to the present invention.

FIG. 4. illustrates a rear view of the slider 100 along lines B—B of FIG. 3a. Again, the view in FIG. 4. is exaggerated for clarity. In FIG. 4, the center rail 124 is shown disposed on the support structure 126. As the slider 100 experiences a nominal roll angle 134, the mechanical spacing 140 between the edge 152 of the center rail 124 and the disk 144 does not impact the minimum mechanical spacing. Thus, the shallow etch portion 150 effectively reduces the width of the air bearing surface at the gap 148. Accordingly, the minimum mechanical spacing 140 for the slider occurs at the edge of the notch 152 in the tip of the center rail 124 where the magnetic head gap 148 is disposed. As a result, the minimum mechanical spacing 140 location is moved closer to the magnetic gap 146 and the difference between the minimum mechanical spacing 140 and the minimum magnetic spacing 146 is reduced. For example, a slider having a 0.125 µm etch depth and a resulting notch width of 80 µm which experiences a nominal 50 µrad flying roll attitude will have a minimum mechanical spacing 40 that is only 2 nanometers (nm) lower than the desired magnetic spacing 46.

Those skilled in the art will recognize that the shallow etch features are not limited to utilization on center rails or on rails wherein the magnetic transducer is located adjacent to the trailing edge of the slider. Similar results can be achieved for planar head designs where the magnetic transducer is not located adjacent to the trailing edge of the slider.

Figure 5:
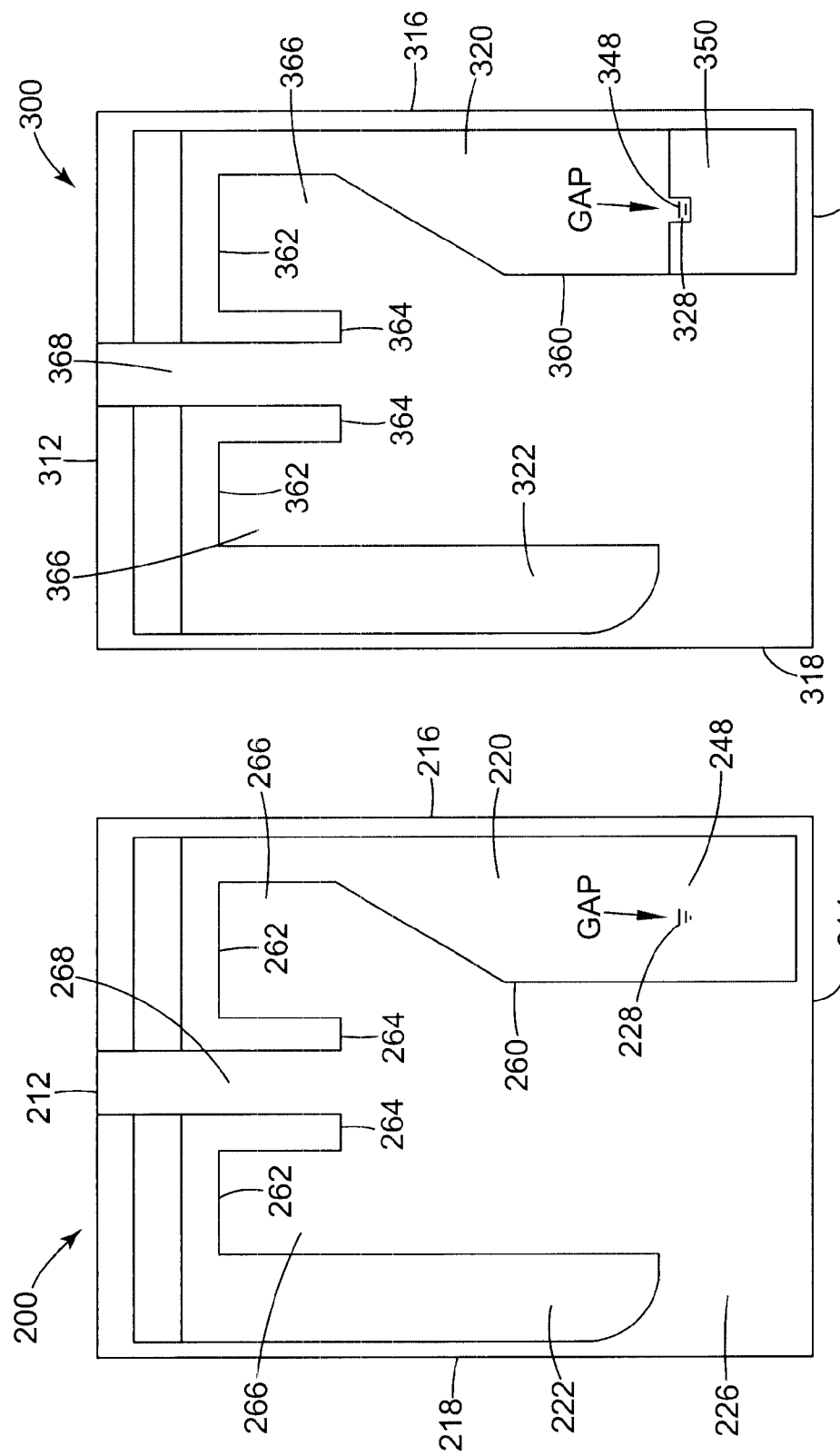

FIG. 5a illustrates a standard negative pressure slider design 200 having a leading edge 212, a trailing edge 214 and two side edges 216, 218. Two side rails 220, 222 for a given performance standard are disposed on a support structure 226. The right side rail 220 includes a broadened area 260 at the trailing edge for supporting the transducer or magnetic head element 228 for performing read/write operations on the disk. The head gap 248 is illustrated at the trailing edge 214 of the right side rail 220. Each of the side rails 220, 222 includes a cross bar section 262 and a subrail 264 which creates a negative pressure pocket 266. Further, the two side rails 220, 222 are separated by a channel 268.

FIG. 5b illustrates a slider 300 according to the present invention having the air bearing surface geometry of the slider in FIG. 5a. However, as shown in FIG. 5b, a shallow etch 350 is made in the right side rail 320 adjacent the magnetic element 328. However, the magnetic element 328 is not disposed at the trailing edge 314 of the slider 300. The shape of the shallow etch 350 in FIG. 5b provides both minimal roll and pitch attitude sensitivity to the slider 300.

FIG. 6 illustrates the modeling results 400 for the standard 410 and shallow etched 412 designs of FIGS. 5a and 5b. It is clear from FIG. 6 that the minimum mechanical fly heights 440 for the two negative pressure designs are substantially identical. However, the shallow etched negative pressure design 412 of FIG. 5b has a lower minimum gap fly height 446 than the standard negative pressure design 410 of FIG. 5a. Overall, the slider with the shaped shallow etch features according to the present invention has a read/write head gap spacing 470 approximately 4 nm lower than the design with this feature. Consequently, the slider with the shaped shallow etch features 412 yields an improved magnetic performance.

The foregoing description of the preferred and alternative embodiments of the invention have been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto.

What is claimed is:

1. A method for making a slider for optimizing head to disk spacing, comprising the steps of:
    forming a support structure having side edges, a leading and a trailing edge;
    forming at least one air bearing surface on the support structure, the air bearing surface having side edges and facing the moving recording disk, the air bearing surfaces providing a mounting surface for a magnetic head; and
    removing a portion of the air bearing surface only at a side edge of the air bearing surface and proximate the magnetic head to increase the spacing between the disk and the slider.

2. The method of claim 1 further comprising the step of removing a portion of the air bearing surface only adjacent both sides of and proximate to the magnetic head.

3. The method of claim 1 wherein the step of providing the surface for mounting the magnetic head further comprises the step of positioning the magnetic head at the center of the slider.

4. The method of claim 1 wherein the step of removing the portion of the air bearing surface comprises the step of completely removing the portion down to the support structure.

5. The method of claim 1 wherein the step of removing the portion of the air bearing surface comprises the step of removing the portion to a level below the air bearing surface but above the support structure.

6. The method of claim 1 wherein the step of removing the portion of the air bearing surface further comprises the step of removing the portion by reactive ion etching techniques.

7. The method of claim 1 wherein the step of removing the portion of the air bearing surface further comprises the step of removing the portion by ion milling.

8. The method of claim 1 wherein the step of removing a portion of the air bearing surface further comprises the steps of shortening the air bearing surface relative to the trailing edge of the support structure, the head being formed at the trailing edge of the shortened air bearing surface at a distance from the trailing edge of the support structure.

* * * * *